(12) United States Patent
Chokka et al.

(10) Patent No.: US 8,416,011 B2
(45) Date of Patent: Apr. 9, 2013

(54) CIRCUIT AND METHOD FOR GENERATING BODY BIAS VOLTAGE FOR AN INTEGRATED CIRCUIT

(75) Inventors: Srinivas Reddy Chokka, Bangalore (IN); Prasad Sawarkar, Bangalore (IN)

(73) Assignee: LSI Corporation, San Jose, CA (US)

( * ) Notice: Subject to any disclaimer, the term of this patent is extended or adjusted under 35 U.S.C. 154(b) by 57 days.

(21) Appl. No.: 12/941,104

(22) Filed: Nov. 8, 2010

(65) Prior Publication Data

US 2012/0112820 A1 May 10, 2012

(51) Int. Cl.
*G05F 1/575* (2006.01)
*G05F 1/585* (2006.01)
*H02M 3/10* (2006.01)

(52) U.S. Cl.
USPC .......................................... 327/537; 327/541

(58) Field of Classification Search .................. None
See application file for complete search history.

(56) References Cited

U.S. PATENT DOCUMENTS

| | | | | |
|---|---|---|---|---|
| 5,397,934 A | * | 3/1995 | Merrill et al. | 327/537 |
| 5,883,544 A | * | 3/1999 | So et al. | 327/537 |
| 6,313,691 B1 | * | 11/2001 | Podlesny et al. | 327/534 |
| 6,522,111 B2 | | 2/2003 | Zadeh et al. | |
| 6,927,619 B1 | | 8/2005 | Doyle | |
| 7,119,604 B2 | * | 10/2006 | Chih | 327/534 |
| 7,564,296 B2 | * | 7/2009 | Ito | 327/534 |
| 7,592,832 B2 | | 9/2009 | Perisetty | |
| 7,863,969 B2 | * | 1/2011 | Furuya et al. | 327/541 |
| 2011/0211717 A1 | * | 9/2011 | Hoevesteen | 381/323 |

* cited by examiner

*Primary Examiner* — Lincoln Donovan
*Assistant Examiner* — Terry L Englund
(74) *Attorney, Agent, or Firm* — Mendelsohn, Drucker & Associates, P.C.; Steve Mendelsohn

(57) ABSTRACT

A circuit includes a PMOS body bias circuit including a PMOS charge pump for generating a positive supply voltage, a PMOS reference voltage generator for providing a PMOS reference voltage, and a PMOS linear voltage regulator circuit for generating a PMOS body bias voltage upon receiving the positive supply voltage and the PMOS reference voltage. The circuit also includes a NMOS body bias circuit including a NMOS charge pump for generating a negative supply voltage, a NMOS reference voltage generator for providing a NMOS reference voltage, and a NMOS linear voltage regulator circuit for generating a NMOS body bias voltage upon receiving the negative supply voltage and the NMOS reference voltage. The PMOS body bias voltage and the NMOS body bias voltage drive bulk of PMOS and NMOS devices in the integrated circuit.

19 Claims, 10 Drawing Sheets

US 8,416,011 B2

CIRCUIT AND METHOD FOR GENERATING BODY BIAS VOLTAGE FOR AN INTEGRATED CIRCUIT

BACKGROUND

The performance of modern integrated circuits is often limited by power consumption considerations. Integrated circuits often use complementary metal-oxide semiconductor (CMOS) transistor technology such as n-channel metal-oxide-semiconductor (NMOS) and p-channel metal-oxide-semiconductor (PMOS) transistors.

Typically, NMOS and PMOS integrated circuits have four terminals—a drain, a source, a gate, and a body. The body terminal, which is sometimes referred to as the well or bulk terminal, can be biased to improve transistor performance. For example, a positive bias voltage can be applied to the body of a PMOS transistor and a negative bias voltage can be applied to the body of an NMOS transistor. The implementation should be such that the body bias voltages should be regulated besides supplying the load current. The load current here is the leakage current of P-well and N-well. These bias voltages increase the effective threshold voltages of the transistors and thereby reducing their leakage currents. Any reductions in the leakage current can also reduce power consumption.

Body bias voltages tend to be a small value. For example, an NMOS body bias voltage may be less than a few hundred millivolts. Larger body bias voltages can be used to reduce the leakage current further, however, may have a significant adverse impact on a device performance. The optimum balance between the reduced leakage current and sacrificed performance is generally obtained using small body bias voltages. Generally, body bias voltages can be generated off chip, however, this approach may consume already limitedly available number of input-output pins in the integrated circuit.

Existing methods for generating body bias voltage use regulated charge pumps. In these methods, the regulation of power supply voltage requires turning the charge pumps ON and OFF to maintain the output voltages within a desired ripple. This approach requires a capacitor at the output of the charge pump otherwise it can result in a higher ripple voltage.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A circuit and method for generating body bias voltage for an integrated circuit is disclosed. in the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The implementation involves linear voltage regulators to maintain desired body bias voltages and to supply the load current. Since the regulated voltages are above and below the rails, the supply to the linear voltage regulators is generated using charge pumps. The references for the linear voltage regulators are derived out of unloaded charge pumps.

Figure 1:
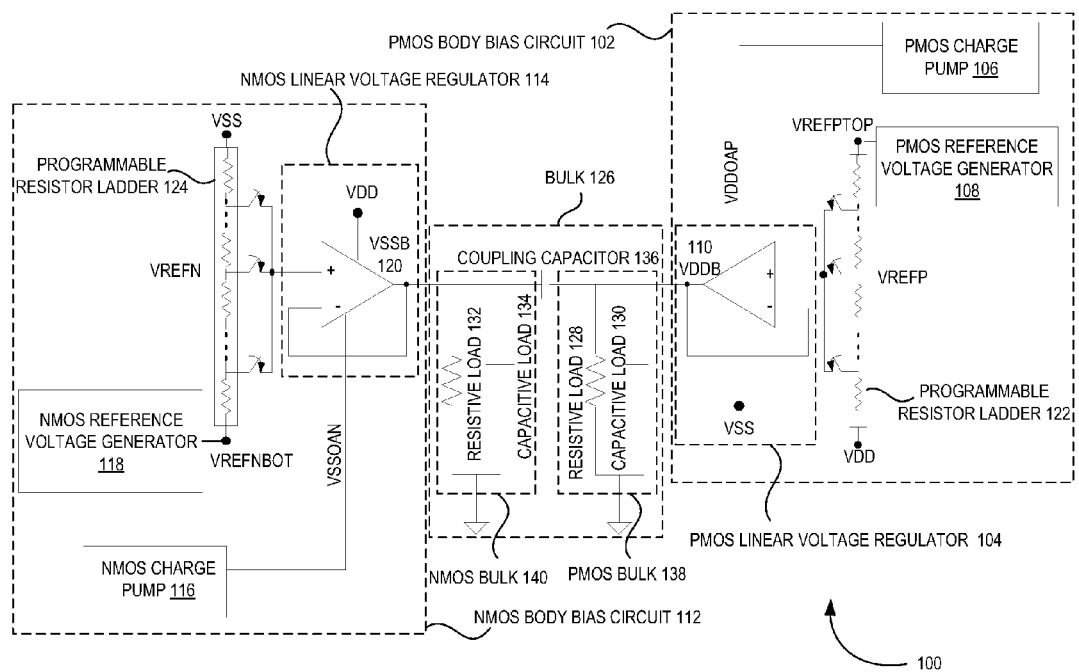
FIG. 1 is an adaptive body bias generation circuit used to bias transistors in an integrated circuit, according to one embodiment.

FIG. 1 is an adaptive body bias generation circuit 100 used to bias transistors in an integrated circuit, according to one embodiment. Particularly, FIG. 1 illustrates a PMOS body BIAS circuit 102 and a NMOS body BIAS circuit 112 to drive a bulk 126 of PMOS and NMOS devices in the integrated circuit. In one embodiment, the adaptive body bias generation circuit 100 operates using a core supply voltage (i.e., VDD).

The PMOS body bias circuit 102 includes a PMOS linear voltage regulator circuit 104, a PMOS charge pump 106 coupled to the PMOS linear voltage regulator circuit 104 and a PMOS reference voltage generator 108 coupled to the PMOS linear voltage regulator circuit 104. In one exemplary implementation, the PMOS reference voltage generator 108 is coupled to the PMOS linear voltage regulator circuit 104 via a first programmable resistor ladder 122.

Figure 3A:
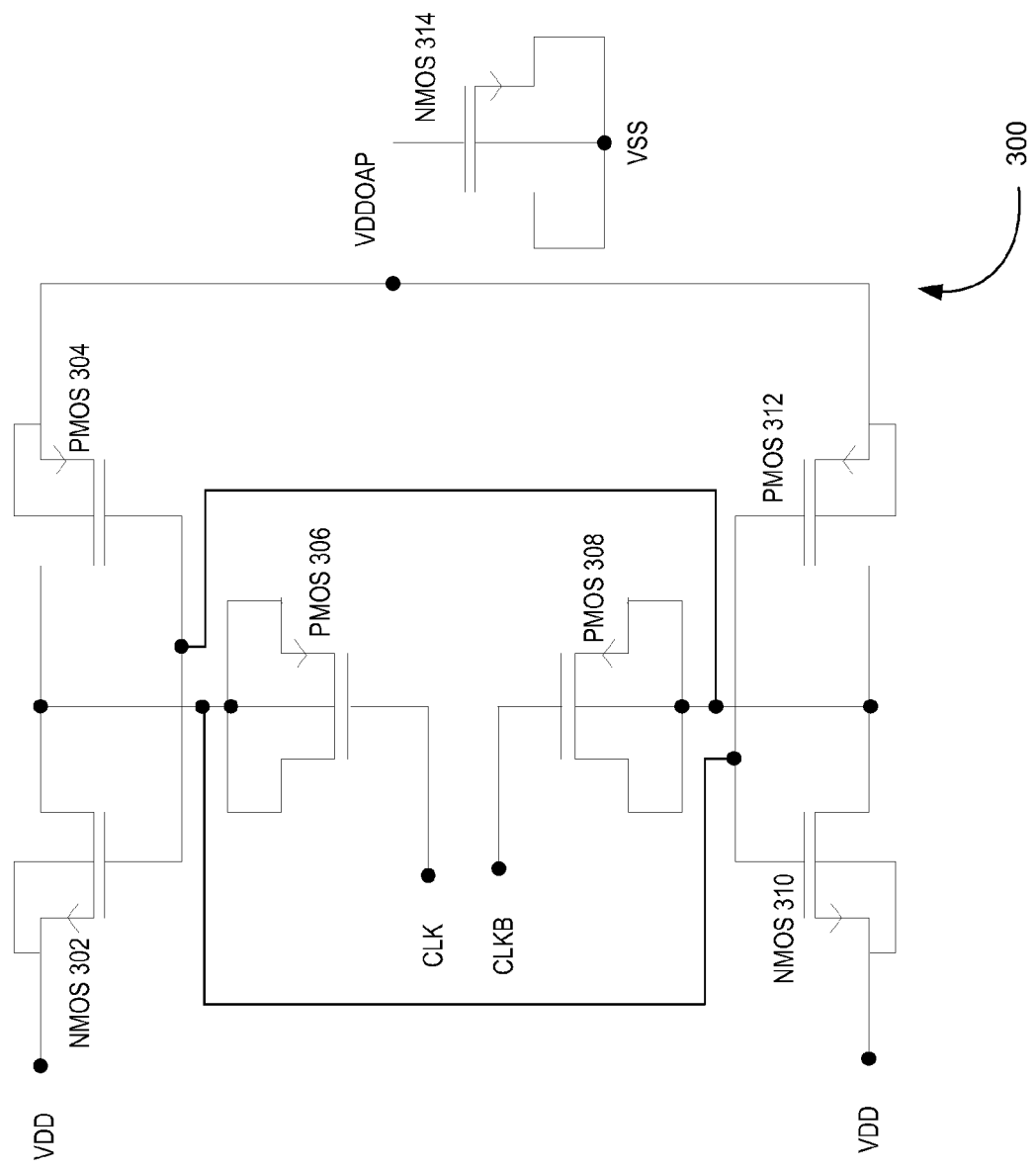
FIG. 3A illustrates a schematic diagram of a charge pump of FIG. 1 for generating a positive supply voltage or a PMOS reference voltage for the PMOS linear voltage regulator circuit of FIG. 2A, according to one embodiment.

The PMOS charge pump 106 generates a positive supply voltage (i.e., VDDOAP) for the PMOS linear voltage regulator circuit 104 using the core supply voltage (VDD). In one example embodiment, the PMOS charge pump 106 is an unregulated charge pump. The PMOS reference voltage generator 108 provides a PMOS reference voltage (VREFP) using the core supply voltage (VDD). In one example embodiment, the PMOS reference voltage generator 108 is an unregulated and/or unloaded charge pump. Further, the PMOS reference voltage generator 108 generates the PMOS reference voltage using a voltage multiplier topology. For example, the voltage multiplier topology includes a voltage doubler topology. In addition, the positive supply voltage and the PMOS reference voltage are generated in parallel. The circuit diagram used for the PMOS charge pump 106 and the PMOS reference voltage generator 108 is illustrated in FIG. 3A.

In one embodiment, the generated positive supply voltage is substantially greater than the PMOS reference voltage to maintain the PMOS linear voltage regulator circuit 104 in saturation during maximum load condition. In one example embodiment, the PMOS reference voltage is generated by using the first programmable resistor ladder 122 connected between the core supply voltage and the PMOS reference voltage generator 108.

In one embodiment, the PMOS linear voltage regulator circuit 104 generates a PMOS body bias voltage (VDDB 110) upon receiving the positive supply voltage from the PMOS charge pump 106 and the PMOS reference voltage from the PMOS reference voltage generator 108. In one embodiment, the generated PMOS body bias voltage for biasing the PMOS bulk 138 is greater than the core supply voltage. In one example embodiment, the PMOS linear voltage regulator circuit 104 includes a two stage op amp having unity gain.

The NMOS body bias circuit 112 includes a NMOS linear voltage regulator circuit 114, a NMOS charge pump 116 coupled to the NMOS linear voltage regulator circuit 114 and a NMOS reference voltage generator 118 coupled to the NMOS linear voltage regulator circuit 114. In one exemplary implementation, the NMOS reference voltage generator 118 is coupled to the NMOS linear voltage regulator circuit 114 via a second programmable resistor ladder 124 as shown in FIG. 1.

Figure 3B:
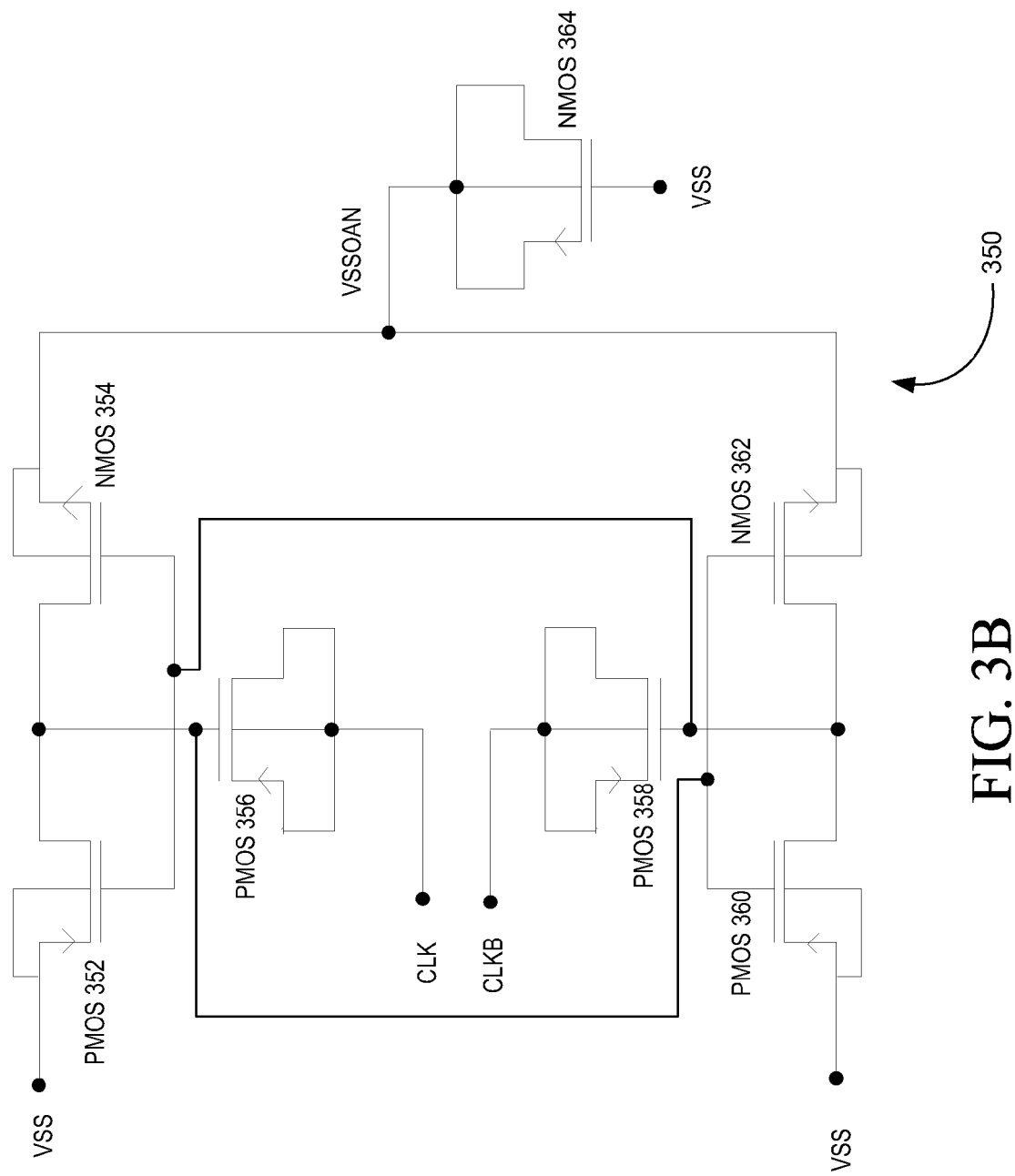
FIG. 3B illustrates a schematic diagram of a charge pump of FIG. 1 for generating a negative supply voltage or a NMOS reference voltage for the NMOS linear voltage regulator circuit of FIG. 2B, according to one embodiment.

The NMOS charge pump 116 generates a negative supply voltage (VSSOAN) for the NMOS linear voltage regulator circuit 114 using the core supply voltage. In one example embodiment, the NMOS charge pump 116 is an unregulated charge pump. The NMOS reference voltage generator 118 provides a NMOS reference voltage (VREFN) using the core supply voltage. In one example embodiment, the NMOS reference voltage generator 118 is an unregulated and/or unloaded charge pump. Further, the NMOS reference voltage generator 118 generates the NMOS reference voltage using a voltage inverter topology. In addition, the negative supply voltage and the NMOS reference voltage are generated in parallel. The circuit diagram used for the NMOS charge pump 116 and the NMOS reference voltage generator 118 is illustrated in FIG. 3B.

In one embodiment, the generated negative supply voltage is substantially less than the NMOS reference voltage to maintain the NMOS linear voltage regulator circuit 114 in saturation during maximum load condition. In one example embodiment, the NMOS reference voltage is generated by using the second programmable resistor ladder 124 connected between a common ground voltage (VSS) and the NMOS reference voltage generator 118.

In one embodiment, the NMOS linear voltage regulator circuit 114 generates a NMOS body bias voltage (VSSB 120) upon receiving the negative supply voltage and the NMOS reference voltage. In one embodiment, the generated NMOS body bias voltage for biasing the NMOS bulk 140 is less than the common ground voltage. In one example embodiment, the NMOS linear voltage regulator circuit 114 includes a two stage op amp having unity gain.

In one embodiment, the PMOS body bias voltage and the NMOS body bias voltage drive bulk 126 of PMOS and NMOS devices in the integrated circuit. In one exemplary implementation, the bulk 126 of PMOS and NMOS devices include a PMOS bulk 138 including a first resistive load 128 and a first capacitive load 130 coupled in parallel, a NMOS bulk 140 including a second resistive load 132 and a second capacitive load 134 coupled in parallel. Further, the bulk 126 of PMOS and NMOS devices include a coupling capacitor 136 having one end connected to the PMOS bulk 138 and other end connected to the NMOS bulk 140.

In operation, the PMOS reference voltage is generated by using the first programmable resistor ladder 122 connected between the core supply voltage and the output (e.g., VREFPTOP) of the PMOS reference voltage generator 108 operating in open loop. The inputs to the PMOS reference voltage generator 108 are clock and the core supply voltage (VDD). In one exemplary implementation, the PMOS reference voltage generator 108 uses a voltage doubler topology, such that the VREFPTOP is equal to 2*VDD. In other words, the PMOS reference voltage (VREFP) can be programmed from VDD to 2*VDD using the first programmable resistor ladder 122.

Further, the PMOS charge pump 106 operating in open loop generates the positive supply voltage (VDDOAP) for the PMOS linear voltage regulator circuit 104. The inputs to the PMOS charge pump 106 are clock and core power supply. In one exemplary implementation, the PMOS charge pump 106 uses the voltage doubler topology. The positive supply voltage generated is greater than the PMOS reference voltage and is also sufficiently high to keep the PMOS linear voltage regulator circuit 104 in saturation under maximum loading condition.

Figure 2A:
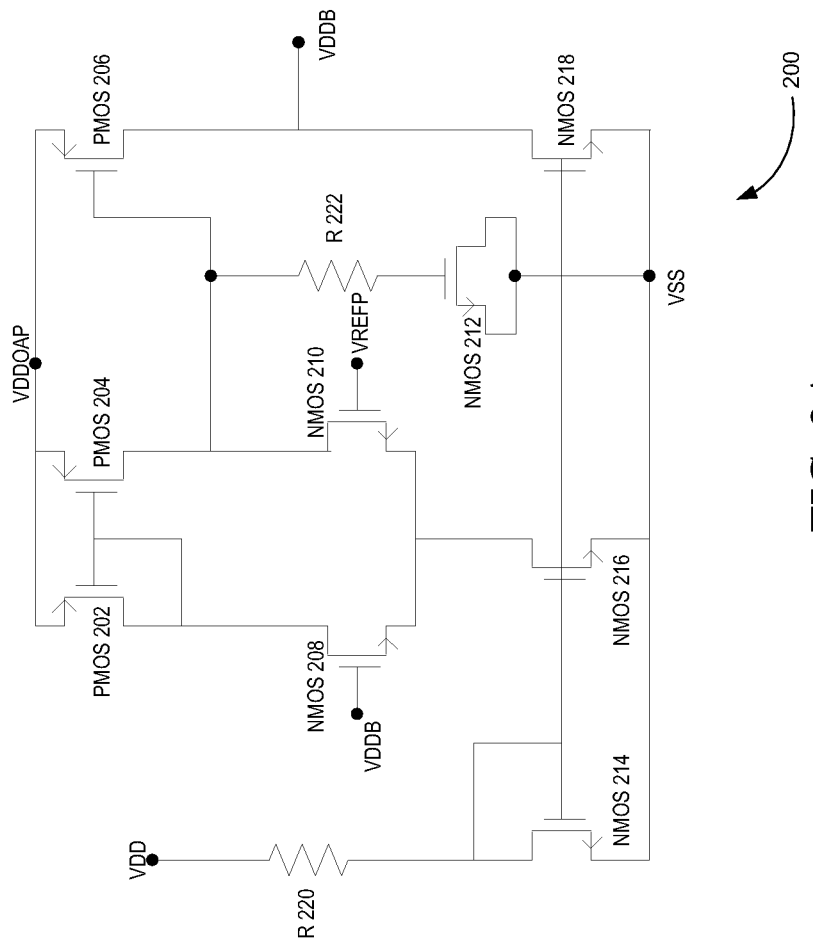
FIG. 2A illustrates a schematic diagram of a PMOS linear voltage regulator circuit of FIG. 1, according to one embodiment.

Further in operation, the PMOS linear voltage regulator circuit 104 connected in unity gain configuration uses the PMOS reference voltage and the positive supply voltage as inputs. The PMOS linear voltage regulator circuit 104 is self biased in nature. The PMOS linear voltage regulator circuit 104, upon receiving the PMOS reference voltage and positive supply voltage, maintains the PMOS body bias voltage (VDDB 110) equal to the PMOS reference voltage as illustrated in FIG. 2A, in addition to supplying the load current. The load current is the leakage current of the reverse biased body diodes (e.g., diodes 502 and 504 shown in FIG. 5A).

Similarly, the NMOS reference voltage is generated by using the second programmable resistor ladder 124 connected between the common ground voltage and output (VREFNBOT) of the NMOS reference voltage generator 118 operating in open loop. The inputs to the NMOS reference voltage generator 118 are clock and the core power supply (VDD). In one exemplary implementation, the NMOS reference voltage generator 118 uses the voltage inverter topology, such that VREFNBOT is equal to −VDD. In other words, the NMOS reference voltage (VREFN) can be programmed from −VDD to VSS using the second programmable resistor ladder 124.

The NMOS charge pump 116 operating in open loop generates the negative supply voltage (VSSOAN) for the NMOS linear voltage regulator circuit 114. The inputs to the NMOS charge pump 116 are clock and the core supply voltage. In one exemplary implementation, the NMOS charge pump 116 uses voltage inverter topology. The NMOS reference voltage generated is less than the NMOS reference voltage and is also sufficiently low to keep the NMOS linear voltage regulator circuit 114 in saturation under maximum loading condition.

Figure 2B:
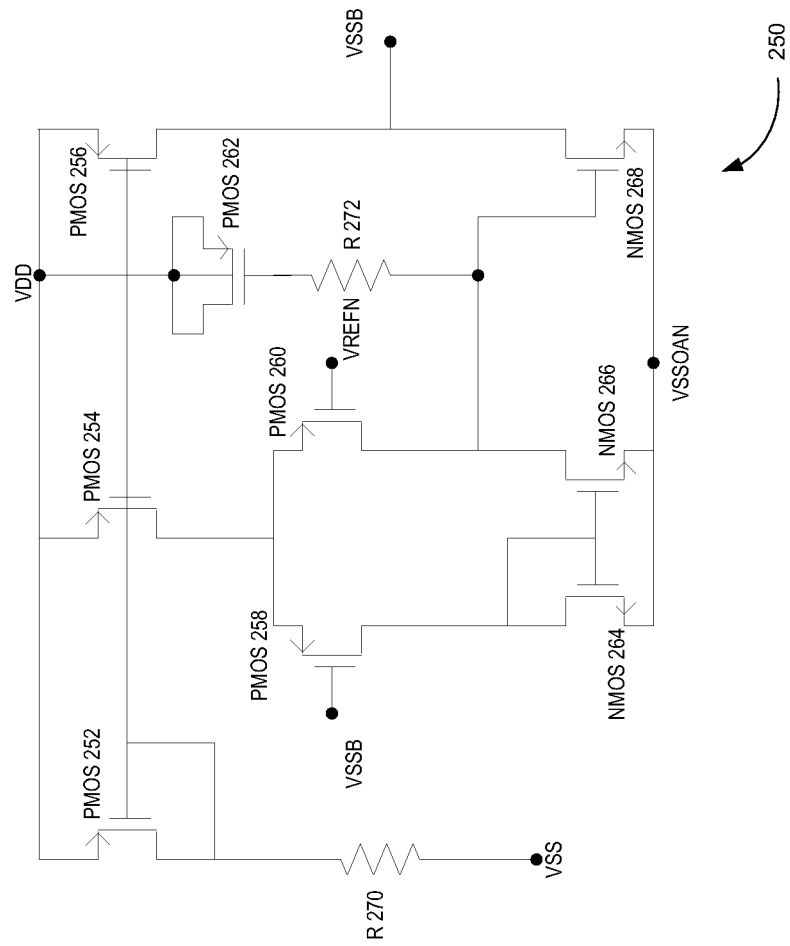
FIG. 2B illustrates a schematic diagram of a NMOS linear voltage regulator circuit of FIG. 1, according to one embodiment.

The NMOS linear voltage regulator circuit 114 connected in unity gain configuration uses the NMOS reference voltage and the negative supply voltage as inputs. The NMOS linear voltage regulator circuit 114 is self biased in nature. The NMOS linear voltage regulator circuit 114, upon receiving the NMOS reference voltage and negative supply voltage, maintains the NMOS body bias voltage (VSSB 120) equal to the NMOS reference voltage (e.g., as illustrated in FIG. 2B), in addition to supplying the load current. The load current is the leakage current of the reverse biased body diodes ((e.g., diodes 552 and 554 shown in FIG. 5A). In one embodiment, the entire adaptive body bias generation circuit 100 operates using the core power supply (VDD) as illustrated in FIG. 2A. The VDDB 110 and VSSB 120 are used to drive the bulk 126 of the PMOS and NMOS devices in the integrated circuit.

FIG. 2A illustrates a schematic diagram 200 of a PMOS linear voltage regulator circuit 104 of FIG. 1, according to one embodiment. Particularly, the PMOS linear voltage regulator circuit 104 includes an OP AMP structure used for generating the PMOS body bias voltage (VDDB). Referring to FIG. 2A, the PMOS linear voltage regulator circuit 104 includes PMOS transistors 202, 204, and 206 and NMOS transistors 208, 210, 212, 214, 216, and 218. The PMOS transistors 202, 204, and 206 receive the positive supply voltage (VDDOAP) from the PMOS charge pump 106 through their respective source terminals. The NMOS transistors 214, 216, and 218 are connected to the common ground voltage (VSS) through their respective source terminals. Also, the NMOS transistor 212 is connected to the ground voltage through the source and drain terminals. Further, the PMOS reference voltage (VREFP) is inputted to a gate of the NMOS transistor 210.

Further, sources of the NMOS transistors 208 and 210 are connected to a drain of the NMOS transistor 216. Further, a first resistor R 220 is connected between the core supply voltage (VDD) and a drain of the NMOS transistor 214. Also, a second resistor R 222 is connected between a gate of the PMOS transistor 206 and a gate of the NMOS transistor 212. Furthermore, a gate of the PMOS transistor 206, a drain of the PMOS transistor 204 and the NMOS transistor 210 are connected to each other.

The PMOS transistors 202 and 204 constitute a first current mirror and the NMOS 214 and 216 constitute a second current mirror. The first current mirror is connected to a drain of the NMOS transistor 208 and the second current mirror is connected to the resistor R 220.

Figure 5A:
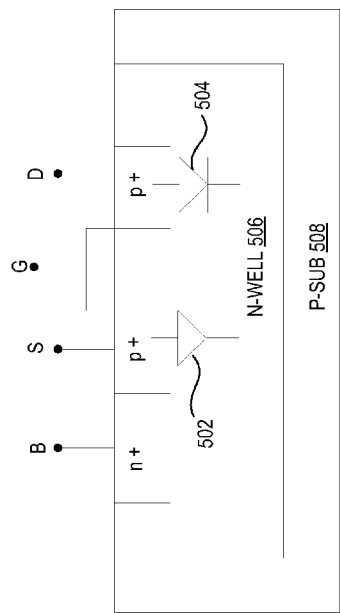
FIG. 5A is a cross-sectional view of a body biased PMOS transistor with reverse biased body diodes representing resistive and capacitive loads, in the context of the present invention.

In operation, the PMOS linear voltage regulator circuit 104 generates the PMOS body bias voltage (i.e., VDDB) using the positive supply voltage from the PMOS charge pump 106 and the PMOS reference voltage from the PMOS reference voltage generator 108. Also, the PMOS linear voltage regulator circuit 104 uses the common ground voltage (VSS) as the negative supply voltage. In one example embodiment, the PMOS linear voltage regulator circuit 104 is a two stage OP AMP and is self biased. Further, the PMOS linear voltage regulator circuit 104 is used in unity gain configuration and maintains the PMOS body bias voltage equal to the PMOS reference voltage (i.e., VDDB=VREFP). The drains of the PMOS transistor 206 and NMOS transistor 218 are connected to the output of the PMOS linear voltage regulator circuit 104 to generate PMOS body bias voltage (VDDB). Since the PMOS linear voltage regulator circuit 104 is configured in unity gain, the gate voltage of the NMOS transistor 208 is also equal to the PMOS body bias voltage. The PMOS linear voltage regulator circuit 104 is compensated for the various resistive and capacitive loads (e.g., as shown in FIG. 5A).

FIG. 2B illustrates a schematic diagram 250 of a NMOS linear voltage regulator circuit 114 of FIG. 1, according to one embodiment. Particularly, the NMOS linear voltage regulator circuit 114 includes an OP AMP structure used for generating the NMOS body bias voltage (VSSB). Referring to FIG. 2B, the NMOS linear voltage regulator circuit 114 includes PMOS transistors 252, 254, 256, 258, 260 and 262 and NMOS transistors 264, 266 and 268. The PMOS transistors 252, 254, and 256 receive the core supply voltage (i.e., VDD) through their respective source terminals. The NMOS transistors 264, 266, and 268 receive the negative supply voltage (VSSOAN) from the NMOS charge pump 116 through their respective source terminals. Also, the PMOS 262 is connected to the core supply voltage through the source and drain terminals. Further, the NMOS reference voltage (VREFN) is inputted to a gate of the PMOS transistor 260.

Further, sources of the PMOS transistors 258 and 260 are connected to a drain of the PMOS transistor 254. Further, a first resistor R 270 is connected between the common ground voltage (VSS) and a drain of the PMOS transistor 252. Also, a second resistor R 272 is connected between a gate of the PMOS transistor 262 and a gate of the NMOS transistor 268. Furthermore, the gate of the PMOS transistor 268 and drains of the PMOS transistor 260 and the NMOS transistor 266 are connected to each other.

The PMOS transistors 252 and 254 constitute a first current mirror and the NMOS 264 and 266 constitute a second current mirror. The first current mirror is connected to the resistor 270 and the second current mirror is connected to a drain of the PMOS transistor 258.

Figure 5B:
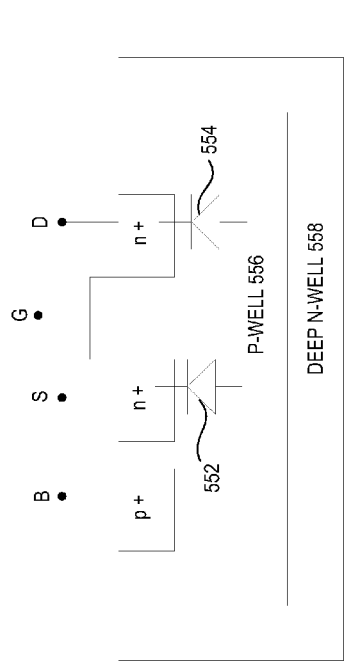
FIG. 5B is a cross-sectional view of a body biased NMOS transistor with reverse biased body diodes representing resistive and capacitive loads, in the context of the present invention.

In operation, the NMOS linear voltage regulator circuit 114 generates the NMOS body bias voltage (i.e., VSSB) using the negative supply voltage (VSSOAN) from the NMOS charge pump 116 and the NMOS reference voltage from the NMOS reference voltage generator 118. In one example embodiment, the NMOS linear voltage regulator circuit 114 is a two stage OP AMP and is self biased. Further, the NMOS linear voltage regulator circuit 114 is used in unity gain configuration and maintains the NMOS body bias voltage equal to the NMOS reference voltage (i.e., VSSB=VREFN). The drains of the PMOS transistor 256 and NMOS transistor 268 are connected to the output of the NMOS linear voltage regulator circuit 114 to output the NMOS body bias voltage (VSSB). Since the NMOS linear voltage regulator circuit 114 is configured in unity gain, the gate voltage of the PMOS transistor 258 is also equal to the NMOS body bias voltage. In one example embodiment, the NMOS linear voltage regulator circuit 114 is compensated for the various resistive and capacitive loads (as shown in FIG. 5B).

Figure 4:
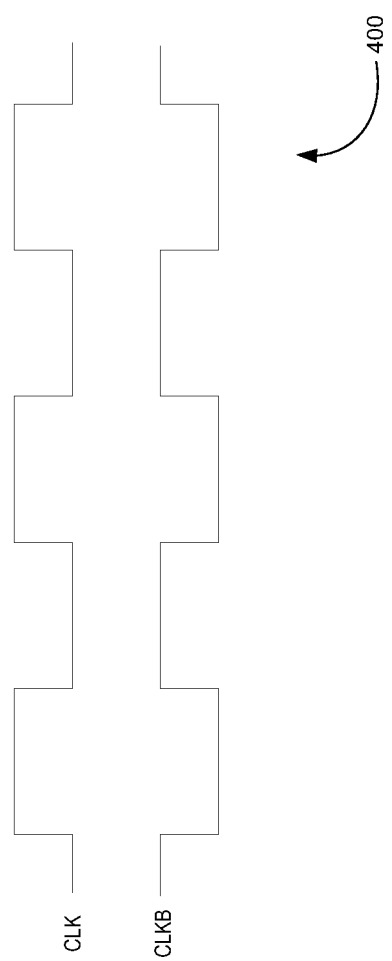
FIG. 4 illustrates a timing diagram of a clock used for the charge pumps of FIGS. 3A and 3B, in accordance with the present invention.

FIG. 3A illustrates a schematic diagram of a charge pump 300 for generating a positive supply voltage or a PMOS reference voltage for the PMOS linear voltage regulator circuit 104 of FIG. 1 and FIG. 2A, according to one embodiment. Particularly, the charge pump 300 can be operated as the PMOS charge pump 106 and/or PMOS reference voltage generator 108 using the first programmable resistor ladder 122. Referring to FIG. 3A, the charge pump 300 includes PMOS transistors 304, 306, 308, and 312 and NMOS transistors 302, 310, and 314. The NMOS transistors 302 and 310 receive the core supply voltage (i.e., VDD) through their respective source terminals. The NMOS transistor 314 receives the ground voltage through the source and drain terminals. Further, the clock signals CLK and CLKB are inputted to respective gates of the PMOS transistors 306 and 308. The clock signals CLK and CLKB are complimentary clock signals and are shown in FIG. 4.

Further, a drain of the NMOS transistor 302 and PMOS transistor 304 are connected to the PMOS transistor 306. A gate of the NMOS transistor 302 is connected to a gate of the PMOS transistor 304. Furthermore, a drain of the NMOS transistor 310 and the PMOS transistor 312 are connected to the PMOS transistor 308 and to the gates of the NMOS transistor 302 and PMOS transistor 304. A gate of the NMOS transistor 310 is connected to a gate of the PMOS transistor 312 and to the drains of the NMOS transistor 302 and PMOS transistor 304. In addition, a gate terminal of the NMOS transistor 314 is connected to the sources of the PMOS transistors 304 and 312 which are connected to each other. The sources of the PMOS transistors 304 and 312 provide the output voltage. In the example embodiment illustrated in FIG. 3A, the positive supply voltage (VDDOAP) is outputted at the sources of the PMOS transistors 304 and 312.

In one exemplary implementation, the charge pump 300 operates as a voltage doubler charge pump in open loop configuration for generating a voltage of "2VDD" which is supplied to the first programmable resistor ladder 122 to tap the desired PMOS reference voltage.

In another exemplary implementation, the charge pump 300 operates as a voltage doubler charge pump in open loop configuration for generating the positive supply voltage (VDDOAP) for the PMOS linear voltage regulator circuit 104. This positive supply voltage has to be greater than the PMOS reference voltage under maximum load condition.

FIG. 3B illustrates a schematic diagram of a charge pump 350 for generating a negative supply voltage or a NMOS reference voltage for the NMOS linear voltage regulator circuit 114 of FIG. 1 and FIG. 2B, according to one embodiment.

Particularly, the charge pump 350 can be operated as the NMOS charge pump 116 and/or NMOS reference voltage generator 118 using the second programmable resistor ladder 124. Referring to FIG. 3B, the charge pump 350 includes PMOS transistors 352, 356, 358, and 360 and NMOS transistors 354, 362, and 364. The PMOS transistors 352 and 360 are connected to the ground voltage (VSS) through their respective source terminals. The NMOS transistor 364 is connected to the ground voltage through a gate terminal. Further, the clock signals CLK and CLKB are inputted to the PMOS transistors 356 and 358 respectively. The clock signals CLK and CLKB are complimentary clock signals and are shown in FIG. 4.

Further, a drain of the PMOS transistor 352 and NMOS transistor 354 are connected to a gate of the PMOS transistor 356. A gate of the PMOS transistor 352 is connected to a gate of the NMOS transistor 354. Furthermore, drains of the PMOS transistor 360 and the NMOS transistor 362 are connected to a gate of the PMOS transistor 358 and to the gates of the PMOS transistor 352 and NMOS transistor 354. A gate of the PMOS transistor 360 is connected to a gate of the NMOS transistor 362 and to the drains of the PMOS transistor 352 and NMOS transistor 354. In addition, source and drain terminals of the NMOS transistor 364 are connected to sources of the NMOS transistors 354 and 362 which are connected to each other. The sources of the NMOS transistors 354 and 362 provide the output voltage. In the example embodiment illustrated in FIG. 3A, the negative supply voltage (VSSOAN) is outputted at sources of the NMOS transistors 354 and 362.

In one exemplary implementation, the charge pump 350 operates as a voltage inverter charge pump in open loop configuration for generating a voltage of "−VDD" which is used by the second programmable resistor ladder 124 to tap the desired NMOS reference voltage.

In another exemplary implementation, the charge pump 350 operates as a voltage inverter charge pump in open loop configuration for generating the negative supply voltage (VSSOAN) for the NMOS linear voltage regulator circuit 114. This negative supply voltage has to be lower than the NMOS reference voltage under maximum load condition.

FIG. 4 illustrates a timing diagram 400 of a clock used for the charge pumps of FIGS. 3A and 3B, in accordance with the present invention. Particularly, FIG. 4 depicts the complementary clock signals CLK, CLKB supplied to the PMOS and NMOS charge pumps shown in FIG. 3A and 3B. Note that the time duration of the CLK high portion of the clock cycle CLK is the same as the CLKB low portion of the clock cycle CLKB, and that the time duration of the CLK low portion of the clock cycle CLK is the same as the CLKB high portion of the clock cycle CLKB. It follows from the above that the duty cycle of the clock waveform CLK can be related to the duty cycle of the complementary clock waveform CLKB as shown in FIG. 4.

FIG. 5A is a cross-sectional view 500 of a body biased PMOS transistor with reverse biased body diodes 502 and 504 representing resistive and capacitive loads, in the context of the present invention. In one example embodiment, the resistive load 128 (i.e., illustrated in FIG. 1) represents the leakage current of the reverse biased body diodes 502 and 504 and the capacitive Load 130 (i.e., illustrated in FIG. 1) represents the capacitance associated with the reverse biased body diodes 502 and 504.

FIG. 5B is a cross-sectional view of a body biased NMOS transistor with reverse biased body diodes 552 and 554 representing resistive and capacitive loads, in the context of the present invention. In one example embodiment, the resistive load 132 (i.e., illustrated in FIG. 1) represents the leakage current of the reverse biased body diodes 552 and 554 and the capacitive Load 134 (i.e., illustrated in FIG. 1) represents the capacitance associated with the reverse biased body diodes 552 and 554.

Figure 6:
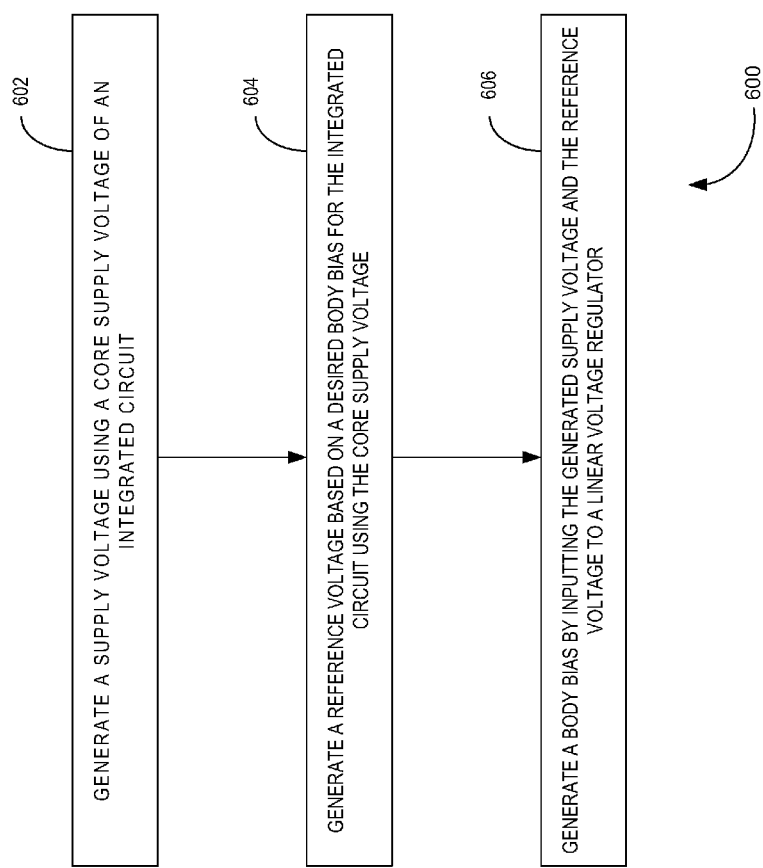
FIG. 6 illustrates a flow chart of a method of generating body bias voltage for an integrated circuit, according to one embodiment.

FIG. 6 illustrates a flow chart 600 of a method of generating body bias voltage for an integrated circuit, according to one embodiment. At step 602, a supply voltage is generated using a core supply voltage (VDD) of the integrated circuit. In these embodiments, a positive supply voltage (VDDOAP) is generated using the core supply voltage for the PMOS linear voltage regulator circuit 104, and a negative supply voltage (VSSOAN) is generated using the core supply voltage for the NMOS linear voltage regulator circuit 114.

At step 604, a reference voltage is generated based on a desired body bias voltage for the integrated circuit using the core supply voltage (VDD). In these embodiments, a PMOS reference voltage (VREFP) is generated using the core supply voltage for the PMOS linear voltage regulator circuit 104 and a NMOS reference voltage (VREFN) is generated using the core supply voltage for the NMOS linear voltage regulator circuit 114. In one embodiment, the supply voltage and the reference voltage are generated in parallel. The PMOS reference voltage is generated using a voltage multiplier topology (e.g., voltage doubler topology) and the NMOS reference voltage is generated using a voltage inverter topology as explained with in FIGS. 3A and 3B. The positive supply voltage is substantially greater than the PMOS reference voltage to maintain the PMOS linear voltage regulator circuit in saturation during maximum load condition. The negative supply voltage is substantially less than the NMOS reference voltage to maintain the NMOS linear voltage regulator circuit in saturation during maximum load condition.

At step 606, a body bias voltage is generated by inputting the generated supply voltage and the reference voltage to a linear voltage regulator circuit. In these embodiments, a PMOS body bias voltage is generated by inputting the positive supply voltage and the PMOS reference voltage to the PMOS linear voltage regulator circuit 104. A NMOS body bias voltage is generated by inputting the negative supply voltage and the NMOS reference voltage to the NMOS linear voltage regulator circuit 114. In one exemplary implementation, the PMOS body bias voltage and the NMOS body bias voltage drive the bulk 126 of PMOS and NMOS devices in the integrated circuit.

Figure 7:
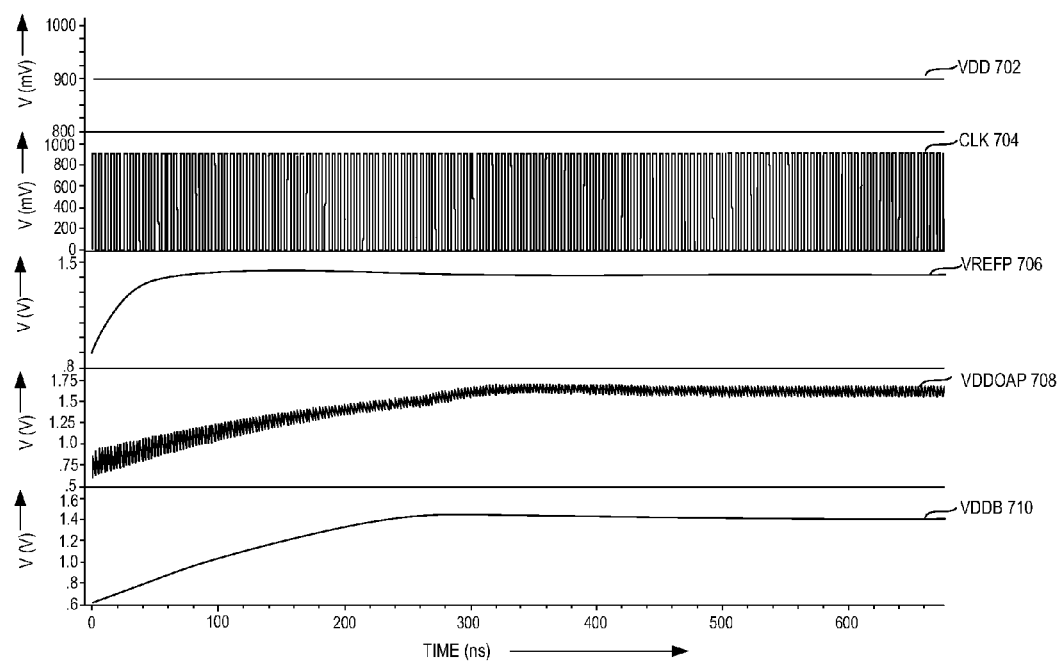
FIG. 7 illustrates an output waveform of the PMOS body bias voltage, according to one embodiment.

FIG. 7 illustrates an output waveform 700 of the PMOS body bias voltage, in accordance with the present invention. Particularly, FIG. 7 illustrates waveforms for the core supply voltage (VDD) 702, the clock signal (CLK) 704, the PMOS reference voltage (VREFP) 706, the positive supply voltage (VDDOAP) 708, and the PMOS body bias voltage (VDDB) 710.

Figure 8:
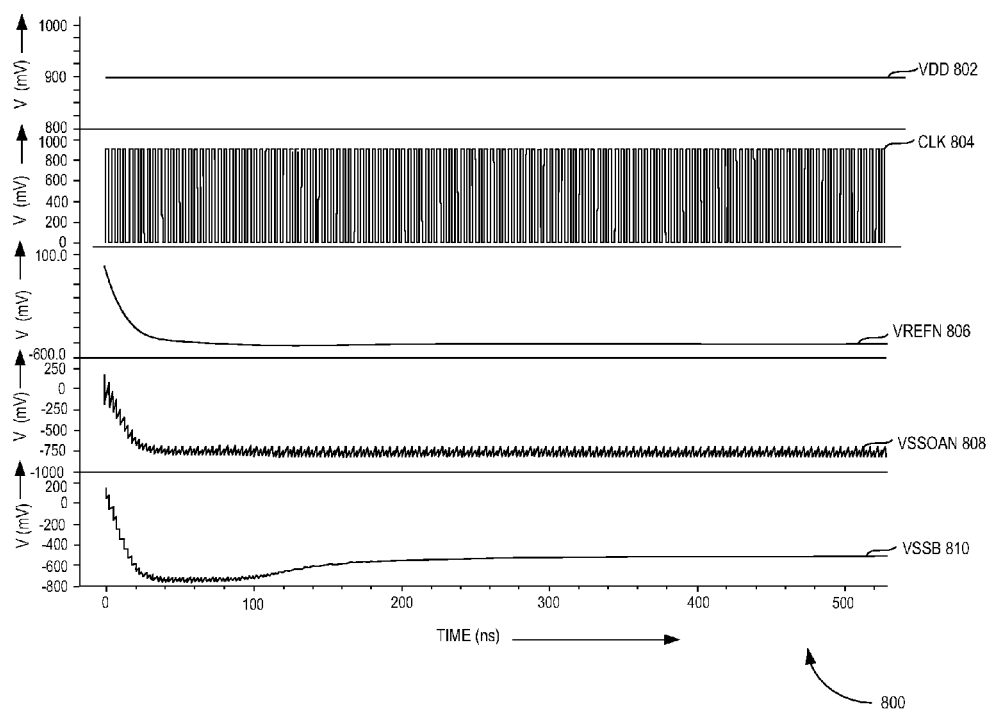
FIG. 8 illustrates an output waveform of the NMOS body bias, according to one embodiment.

FIG. 8 illustrates an output waveform of the NMOS body bias voltage, in accordance with the present invention. Particularly, FIG. 8 illustrates waveforms for the core supply voltage (VDD) 802, the clock signal (CLK) 804, the NMOS reference voltage (VREFN) 806, the negative supply voltage (VSSOAN) 808, and the NMOS body bias voltage (VSSB) 810.

Further, the methods and circuit described in FIGS. 1 through 8 involves linear voltage regulation of the core supply voltage and hence provides a ripple free solution. The method and circuit described above also removes the capacitor dependency at the output of charge pump.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. An adaptive body bias generation circuit, comprising:
   a PMOS body bias circuit, wherein the PMOS body bias circuit comprises:
      a PMOS linear voltage regulator circuit for generating a PMOS body bias voltage;
      a PMOS charge pump coupled to the PMOS linear voltage regulator circuit for generating a positive supply voltage for the PMOS linear voltage regulator circuit using a core supply voltage; and
      a PMOS reference voltage generator coupled to the PMOS linear voltage regulator circuit for providing a PMOS reference voltage using the core supply voltage and wherein the PMOS linear voltage regulator circuit generates the PMOS body bias voltage upon receiving the positive supply voltage and the PMOS reference voltage;
   a NMOS body bias circuit, wherein the NMOS body bias circuit comprises:
      a NMOS linear voltage regulator circuit for generating a NMOS body bias voltage;
      a NMOS charge pump coupled to the NMOS linear voltage regulator circuit for generating a negative supply voltage for the NMOS linear voltage regulator circuit using the core supply voltage; and
      a NMOS reference voltage generator coupled to the NMOS linear voltage regulator circuit for providing a NMOS reference voltage using the core supply voltage and wherein the NMOS linear voltage regulator circuit generates the NMOS body bias voltage upon receiving the negative supply voltage and the NMOS reference voltage, wherein the PMOS body bias voltage and the NMOS body bias voltage drive a substrate of PMOS and NMOS devices in an integrated circuit.

2. The adaptive body bias generation circuit of claim 1, wherein the PMOS reference voltage generator is coupled to the PMOS linear voltage regulator circuit via a programmable resistor ladder.

3. The adaptive body bias generation circuit of claim 1, wherein the NMOS reference voltage generator is coupled to the NMOS linear voltage regulator circuit via a programmable resistor ladder.

4. The adaptive body bias generation circuit of claim 1, wherein the PMOS reference voltage is generated by using a programmable resistor ladder connected between the core supply voltage and the PMOS reference voltage generator.

5. The adaptive body bias generation circuit of claim 1, wherein the NMOS reference voltage is generated by using a programmable resistor ladder connected between a common ground voltage and the NMOS reference voltage generator.

6. The adaptive body bias generation circuit of claim 1, wherein the PMOS charge pump and the NMOS charge pump are unregulated charge pumps.

7. The adaptive body bias generation circuit of claim 1, wherein the PMOS reference voltage generator generates the PMOS reference voltage using a voltage multiplier topology and wherein the NMOS reference voltage generator generates the NMOS reference voltage using a voltage inverter topology.

8. The adaptive body bias generation circuit of claim 1, wherein the positive supply voltage is substantially greater than the PMOS reference voltage to maintain the PMOS linear voltage regulator circuit in saturation during maximum load condition.

9. The adaptive body bias generation circuit of claim 1, wherein the negative supply voltage is substantially less than the NMOS reference voltage to maintain the NMOS linear voltage regulator circuit in saturation during maximum load condition.

10. The adaptive body bias generation circuit of claim 1, wherein each of the PMOS linear voltage regulator circuit and the NMOS linear voltage regulator circuit includes a two stage op amp having unity gain.

11. The adaptive body bias generation circuit of claim 1, wherein the substrate of PMOS and NMOS devices comprises:
   a PMOS substrate including a first resistive load and a first capacitive load coupled in parallel;
   a NMOS substrate including a second resistive load and a second capacitive load coupled in parallel; and
   a coupling capacitor, wherein one end of the coupling capacitor is connected to the PMOS substrate and other end of the coupling capacitor is connected to the NMOS substrate.

12. The adaptive body bias generation circuit of claim 1, wherein the generated PMOS body bias voltage, for biasing a PMOS substrate of the substrate of PMOS and NMOS devices, is greater than the core supply voltage and the generated NMOS body bias voltage, for biasing a NMOS substrate of the substrate of PMOS and NMOS devices, is less than a common ground voltage.

13. A method of generating body bias for an integrated circuit, comprising:
   generating a supply voltage using a core supply voltage of the integrated circuit;
   generating a reference voltage based on a desired body bias voltage for the integrated circuit using the core supply voltage, wherein generating the reference voltage comprises:
      generating a PMOS reference voltage using the core supply voltage for a PMOS linear voltage regulator circuit, wherein the PMOS reference voltage is generated using a voltage multiplier topology; and generating a NMOS reference voltage using the core supply voltage for a NMOS linear voltage regulator circuit, wherein the NMOS reference voltage is generated using a voltage inverter topology; and generating the desired body bias voltage by inputting the generated supply voltage and the corresponding reference voltage to the corresponding linear voltage regulator circuit.

14. The method of claim 13, wherein generating the supply voltage comprises:

generating a positive supply voltage using the core supply voltage for the PMOS linear voltage regulator circuit; and generating a negative supply voltage using the core supply voltage for the NMOS linear voltage regulator circuit.

15. The method of claim 14, wherein the positive supply voltage is substantially greater than the PMOS reference voltage to maintain the PMOS linear voltage regulator circuit in saturation during maximum load condition.

16. The method of claim 14, wherein the negative supply voltage is substantially less than the NMOS reference voltage to maintain the NMOS linear voltage regulator circuit in saturation during maximum load condition.

17. The method of claim 14, wherein generating the desired body bias voltage by inputting the generated supply voltage and the corresponding reference voltage to the corresponding linear voltage regulator circuit comprises:

generating a PMOS body bias voltage by inputting the positive supply voltage and the PMOS reference voltage to the PMOS linear voltage regulator circuit; and generating a NMOS body bias voltage by inputting the negative supply voltage and the NMOS reference voltage to the NMOS linear voltage regulator circuit.

18. The method of claim 17, wherein the PMOS body bias voltage and the NMOS body bias voltage drive a substrate of PMOS and NMOS devices in the integrated circuit.

19. An adaptive body bias generation circuit, comprising:

a PMOS body bias circuit, wherein the PMOS body bias circuit comprises:

a PMOS linear voltage regulator circuit for generating a PMOS body bias voltage;

a PMOS charge pump coupled to the PMOS linear voltage regulator circuit for generating a positive supply voltage for the PMOS linear voltage regulator circuit; and a PMOS reference voltage generator coupled to the PMOS linear voltage regulator circuit for providing a PMOS reference voltage and wherein the PMOS linear voltage regulator circuit generates the PMOS body bias voltage upon receiving the positive supply voltage and the PMOS reference voltage;

a NMOS body bias circuit, wherein the NMOS body bias circuit comprises:

a NMOS linear voltage regulator circuit for generating a NMOS body bias voltage;

a NMOS charge pump coupled to the NMOS linear voltage regulator circuit for generating a negative supply voltage for the NMOS linear voltage regulator circuit; and a NMOS reference voltage generator coupled to the NMOS linear voltage regulator circuit for providing a NMOS reference voltage and wherein the NMOS linear voltage regulator circuit generates the NMOS body bias voltage upon receiving the negative supply voltage and the NMOS reference voltage, wherein the PMOS body bias circuit and the NMOS body bias circuit operate using a core supply voltage, and wherein the PMOS body bias voltage and the NMOS body bias voltage drive a substrate of PMOS and NMOS devices in an integrated circuit.

* * * * *